(No Model.)
C. D. TYLER.
NUT LOCK.
No. 257,788. Patented May 9, 1882.
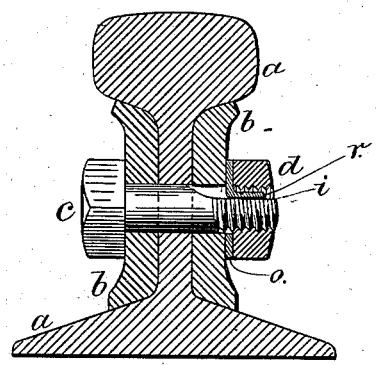
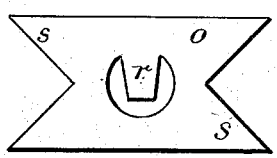
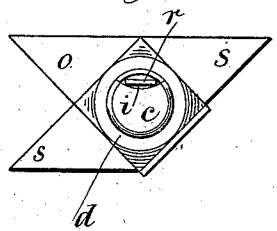
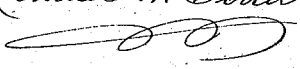

UNITED STATES PATENT OFFICE.

CHARLES D. TYLER, OF NEWARK, N. J., ASSIGNOR TO HIMSELF, CLARK W. MILLS, OF POMPTON, N. J., AND CASIMIR THORON, OF NEW YORK, N. Y.

NUT-LOCK.

SPECIFICATION forming part of Letters Patent No. 257,788, dated May 9, 1882.

Application filed January 3, 1882. (No model.)

*To all whom it may concern:*

Be it known that I, CHARLES D. TYLER, of Newark, in the county of Essex and State of New Jersey, have invented an Improvement in Lock-Nuts, of which the following is a specification.

The washers of gas-cocks have been made with a segmental hole to fit upon the stem, where the cylindrical portion is filed away at one side. Washers for lock-nuts have been made in the same manner, and in other cases the threaded portion of the bolt has been made with a slot to receive a short tongue on the washer, that prevents the washer turning, or a longer bent tongue has passed into the slot. Washers have also been made with points that can be turned up to prevent the nut unscrewing.

My invention does not consist broadly in either of these elementary devices. I make the washer with a broad tapering tongue, cut from the metal where the hole is formed, and turned up so as to occupy a space produced by removing the surface of the bolt at one side. The nut screws over this tapering tongue easily at its outer end; but toward its base the outer angles of the tapering tongue are compressed by the action of the threads of the nut. This prevents any looseness of the tongue within its recess, and at the same time I am able to use as broad and strong a base to the tapering tongue as possible without cutting away the side of the bolt unnecessarily, and after the nut has been screwed up to place one of the points that project from the washer is turned up against one of the sides of the nut to prevent the same turning back and becoming loose. By this construction the washer can be used more than once, because the tongue is not liable to be broken or injured, and, being tapering, is wedged tightly by the action of the nut, and when the point that holds the nut is hammered back to allow the nut to be tightened or removed either the same point can be turned up a second time or else one of the other points can be used to hold the nut in the position to which it may be set up.

In the drawings, Figure 1 is a vertical cross-section of the rail, joint-bars, and nut, the bolt being in elevation. Fig. 2 is a separate view of the washer. Fig. 3 is a view of the nut, washer, and bolt endwise of the latter.

The rails *a* and joint-bars *b* are of any usual character, and although my lock-nut is especially adapted to joint-bars for railway-tracks, I do not limit myself in its use.

The bolt *c* and nut *d* are of the desired size and character. One side of the bolt, where the screw-thread is cut, is removed or flattened, so that there is a segmental space, as at *i*, between the flattened surface and the interior of the nut *d*.

The washer *o* is preferably of iron, and made with several points, *s*, and in the center is an opening for the passage of the bolt; but, instead of the opening being cut out the same as the sectional shape of the bolt, a tongue, *r*, is left in the shape shown in Fig. 2, and then this tongue is turned up at right angles and passes into the space *i*, to prevent the washer revolving upon the bolt, and the nut, when screwed upon the bolt, confines the tongue, and after the nut has been screwed to place one or more of the points *s* is turned up against one flat side of the nut.

The flattened side of the bolt may be more or less concaved, so as to receive the tongue *r*, and the edges of this tongue may be rounded by the dies that press or bend up the tongue after it has been cut out, so that the thread of the nut will not be injured by contact with the angles of the tongue.

I claim as my invention—

In combination with a nut and a bolt having one side removed, a washer having points and a tapering tongue turned up from the metal of the washer in forming the hole for the bolt, the base of such tapering tongue being of a width to cause it to be compressed at its angles by the nut as it is screwed upon the tongue, substantially as and for the purposes set forth.

Signed by me this 28th day of December, A. D. 1881.

C. D. TYLER.

Witnesses:
 GEO. T. PINCKNEY,
 CHAS. H. SMITH.